(12) United States Patent
Adamski et al.

(10) Patent No.: US 6,975,587 B1
(45) Date of Patent: Dec. 13, 2005

(54) MECHANISM FOR AUTOMATIC PROTECTION SWITCHING IN A ROUTER

(75) Inventors: Dan Adamski, Nevcan (CA); David Benson, Acton, MA (US); Bilel Jamoussi, Nashua, NH (US); Yunzhou Li, Lowell, MA (US); Jagannath Shantigram, Cambridge, MA (US)

(73) Assignee: Nortel Networks Limited, (CA)

( * ) Notice: Subject to any disclaimer, the term of this patent is extended or adjusted under 35 U.S.C. 154(b) by 637 days.

(21) Appl. No.: 09/648,273

(22) Filed: Aug. 25, 2000

(51) Int. Cl.$^7$ .......................... G01R 31/08; H04L 12/28
(52) U.S. Cl. ...................... 370/217; 370/419; 370/426
(58) Field of Search ............................... 370/419, 420, 370/389, 225, 227, 228, 216, 226, 360, 395.1, 370/217, 219, 220, 221, 345, 399, 398, 395.31, 370/395.4, 412, 392, 238; 709/235

(56) References Cited

U.S. PATENT DOCUMENTS

| | | | | |
|---|---|---|---|---|
| 5,513,174 A | * | 4/1996 | Punj ............................. | 370/17 |
| 5,751,710 A | * | 5/1998 | Crowther et al. ........... | 370/423 |
| 5,787,070 A | * | 7/1998 | Gupta et al. ................ | 370/217 |
| 5,796,729 A | * | 8/1998 | Greaney ...................... | 370/345 |
| 6,005,841 A | * | 12/1999 | Kicklighter ................. | 370/217 |
| 6,069,895 A | * | 5/2000 | Ayandeh ..................... | 370/399 |
| 6,330,221 B1 | * | 12/2001 | Gomez ........................ | 370/217 |
| 6,553,031 B1 | * | 4/2003 | Nakamura et al. .......... | 370/392 |
| 6,574,686 B1 | * | 6/2003 | Sha et al. ..................... | 710/38 |
| 6,611,409 B1 | * | 8/2003 | Yasue et al. ................... | 361/67 |
| 6,628,649 B1 | * | 9/2003 | Raj et al. ..................... | 370/360 |
| 6,631,134 B1 | * | 10/2003 | Zadikian et al. ........ | 370/395.21 |

OTHER PUBLICATIONS

"Network Element Architectural Features", GR-253-CORE, Issue 2, Dec. 1995, Revision 2, Jan. 1999, SONET Transport Systems: Common Criteria Network Element Architectural Features.

* cited by examiner

*Primary Examiner*—Hanh Nguyen
(74) *Attorney, Agent, or Firm*—Steubing McGuinness & Manaras LLP (57) ABSTRACT

In a router, externally received messages addressed to an active line card are bridged to a protection line card. Each line card in the router is programmed to respond to such externally received messages by directing them to the protection line card associated with the active line card as well as to the active line card. The protection line card is configured with inbound and outbound path tables that are the clones of the inbound and outbound path tables of its corresponding active line card. Bridging is accomplished by revising descriptors stored in a plurality of line cards to indicate an association between an active one of the line cards and its protection line card. Received messages are addressed using the revised descriptors to the active line card and also to its protection line card. Upon failure of an active line card, its physical interface can be disabled once its protection line card has clones of the inbound and outbound path tables and bridging has been set up.

9 Claims, 7 Drawing Sheets

MECHANISM FOR AUTOMATIC PROTECTION SWITCHING IN A ROUTER

FIELD OF THE INVENTION

The present invention is directed to routers, in particular, a method for increasing the speed of failover between an active line card and a protection line card in a router.

BACKGROUND OF THE INVENTION

A router typically includes a series of line cards in connection with a communication fabric. A routing table is initially downloaded to each line card along with configuration files. One of these files in particular, the dispatch table, is specifically constructed for suitability for use within a local routing switch processor in the line card. Thus, the dispatch file is an example of an interface specific table. Other files may be more global in nature and are similarly downloaded to each of the line cards. When a line card or one of the routing paths on the line card fails, a message is sent to the router's central controller which triggers the downloading of configuration files and routing table to an available working line card that will then take over for the failed line card. Once loaded with the configuration files and the routing table, a replacement card is in a position to behave as if it were the failed line card. The downloading of files using the central controller of the router is a relatively lengthy operation which comprises a major portion of the time required to complete a failover from a failed line card to a replacement line card. When the working line card fails, a central controller detects the failure of the working driver and thinks the interface is down. All routes to the working line card are shut down. In accordance with the prior art, there may be a 2–10 minute delay before the replacement line card comes up and is able to accept the traffic originally designated for the working line card. Such delays are unacceptable in a number of applications, such as when a router is used to forward and maintain phone conversation connections. Typically with phone conversations, a maximum interruption of 60 milliseconds is allowed, above which the phone connection is dropped.

SUMMARY OF THE INVENTION

In accordance with an embodiment of the invention, a protection line card in the router is established for one of the active line cards in the router. Each of the active line cards in the router are made aware of the relationship between the protection line card and its associated active line card. A data forwarding module in each of the active line cards is programmed to respond to externally received messages addressed to the active line card by directing such externally received messages through the communication fabric to the protection line card as well as the active line card. The bridging of messages to both the active line card and protection line card is performed by addressing a slot corresponding to the protection line card in addition to the active line card that is associated with the externally received message. The data forwarding module in each line card makes use of descriptors with protection association information that indicate the relationship between the protection cards and their associated active line cards. The data forwarding module may also be called a routing switch processor. In accordance with an embodiment of the invention, the protection line card is configured with outbound path tables that are clones of the outbound path tables from its associated active line card. As used herein, tables are data regardless of the form in which it is stored. The tables are used for routing functions such as forwarding, filtering, setting policies and the like. As used herein, tables of a path are cloned when enough information has been copied so that the cloned path is able to functionally substitute for the original path. The outbound path tables are used in conjunction with traffic from the communication fabric of the router bound for an outbound port.

In accordance with a method of the present invention, a first router is provided with an active line card and a protection line card in connection with an active line card and a protection line card in a second router. Outbound path tables of the active line card in the first router are cloned into the outbound paths of the protection line card in the first router. It may also be necessary to clone the inbound path of the active line card into the protection line card. The protection line card would take over operation after a failure is detected on the active line card. Protection association information stored in the plurality of line cards in the first router is revised so that messages directed through a fabric of the first router to the active line card of the first router are also directed through the fabric to the protection line card. In accordance with one embodiment of the invention, the detection of a failure occurs prior to revising the protection association information. In accordance with an alternate embodiment of the invention, revising the protection association information and bridging communications to the active and protection line cards occurs before detecting a failure of the active line card. When a failure is detected by the first router, the second router is notified of the failure so that it too can revise protection association information in its plurality of line cards to bridge communications to the protection line card channel. Upon detecting a failure of the active line card and revising the protection association information in the plurality of line cards, traffic is switched to the protection line card by disabling the active line card physical card interface and enabling the protection line card physical card interface.

In accordance with a further embodiment of the invention, a computer program product includes program code for configuring a protection line card with outbound path tables that are clones of outbound path tables in an active one of the line cards. It further includes code for revising protection association information stored in a plurality of line cards so as to indicate an association between the active line card and the protection line card so messages directed to the active line card will also be directed to the protection line card.

In accordance with the present invention, failure of an active line card backed up by a protection line card results in a rapid failover to the protection line card. Other objects and advantages of the invention will become apparent during the following % description of the presently preferred embodiments of the invention taken in conjunction with the drawings.

DETAILED DESCRIPTION OF THE PREFERRED EMBODIMENTS

Figure 1:
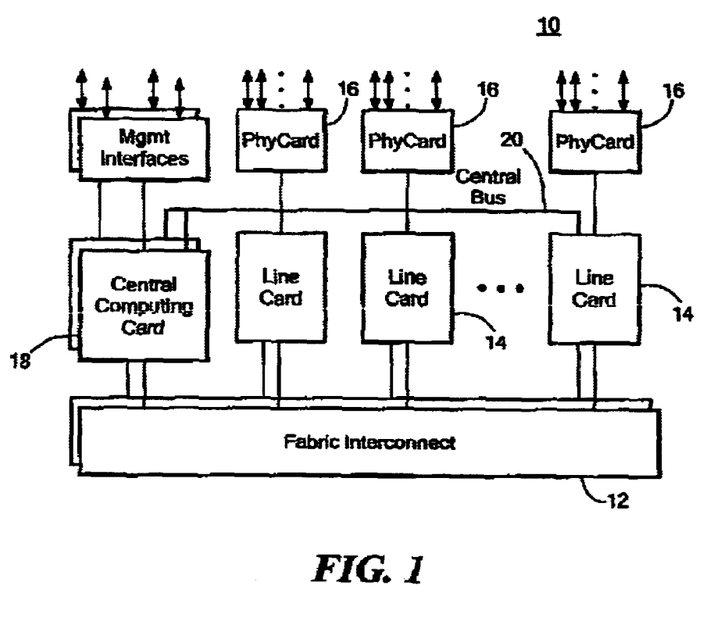
FIG. 1 is a schematic block diagram of a router.

Referring now to FIG. 1, a router 10 has a communication fabric 12 through which messages received on an inbound path of one line card 14 can be forwarded to an outbound path of any line card 14 in the router in order to direct a message towards its ultimate destination. The line cards 14 are inserted in slots that connect them with the communication fabric 12. The communication fabric 12 may also be known or referred to as a switching fabric. The line cards 14 are in connection with the communication fabric 12 for receiving and sending messages through the router 10. Each line card 14 is also connected to a physical card 16 which handles communications with other routers through external connections. The physical card 16 runs a higher level routing protocol such as SONET.

The router 10 further includes a central computing engine 18. In preferred embodiments, a pair of redundant central computers 18 are employed. The central computing engine 18 is connected to the fabric 12 and to a control bus 20. The control bus connects the central computing engine with the line cards 14 for sending and receiving control and supervisory information. Network management interfaces are connected with the central computing engine 18 monitoring status and statistics from the central computing engine 18.

Figure 2:
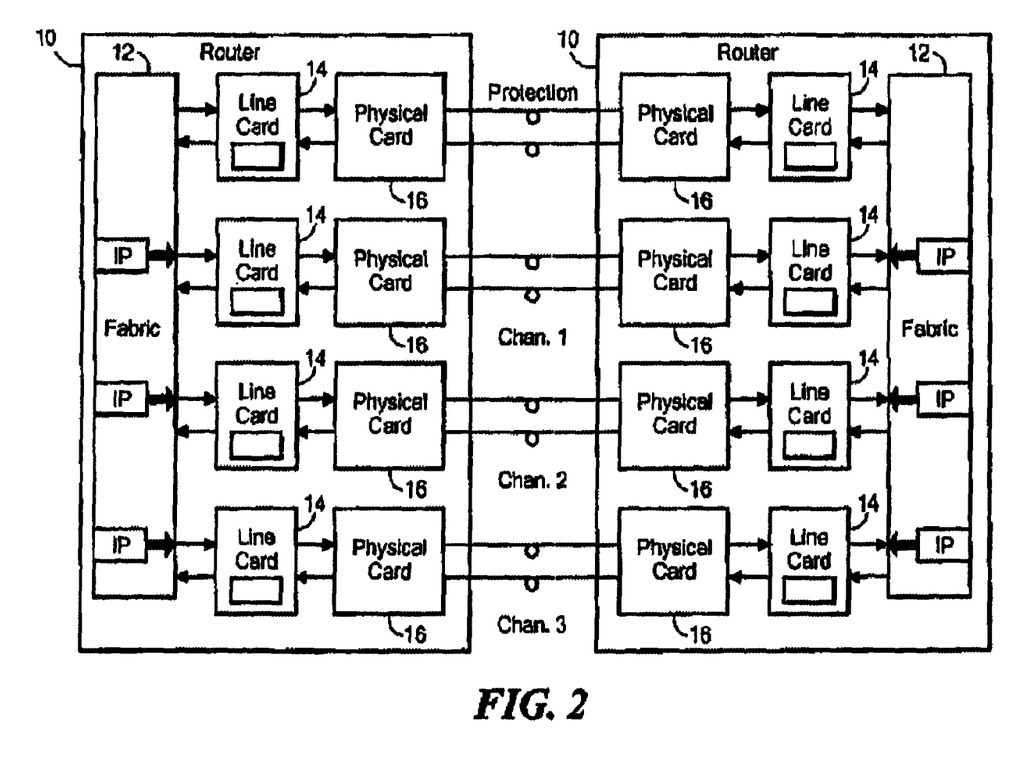
FIG. 2 is a schematic block diagram of two connected routers.

FIG. 2 illustrates two routers 10 in connection with one another forming a number of communication channels. This merely shows the connections between the two routers. Each router may include additional line cards and ports for connection with other routers. The figure shows three working channels each with its own IP address and a protection channel. In accordance with one embodiment of the invention, the protection channel acts as protection for one designated active working channel. In accordance with another embodiment of the invention, the protection channel may be associated with a plurality of active working channels. In such an embodiment, it is preferred that the protection channel be primarily associated with one designated working channel and, when needed, able to instead substitute for one of the other working channels should such other one fail. In this embodiment, increased failover speed is achieved with respect to the primary working channel and ordinary failover speed is experienced for failing over to one of the other working channels.

Figure 3:
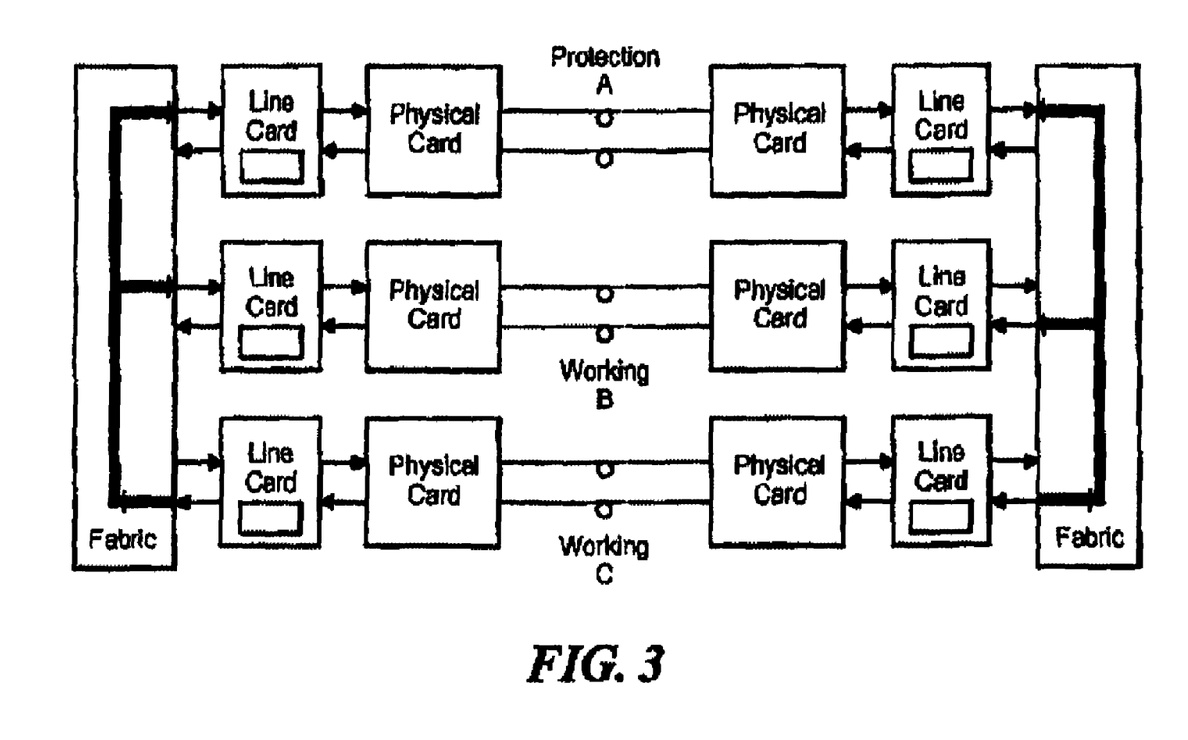
FIG. 3 is a schematic block diagram illustrating the bridging of messages to an active line card and its protection line card.

Protecting a failure on a working channel involves bridging the working channel traffic onto the protection channel through the switching fabric 12 as shown in FIG. 3. An externally received message on working channel C bound for working channel B is bridged to the protection channel for working channel B. An "externally received message" is one that is received by a router from outside the router, typically through a physical card. Bridging is accomplished by addressing the externally received message with a slot corresponding to the protection line card in addition to the working line card which was originally addressed. Protection association information stored in descriptors in each of the line cards associates an active line card with a protection line card to which it is being bridged. In a preferred embodiment, a header in accordance with the protection association information is added to the message to send the message over the fabric to the protection line card and the originally addressed line card. Alternatively, bridging could be accomplished by successively sending the message to the destination active line card and the protection line card. It is the preferred embodiment that will be described herein. Each line card 14 has a data forwarding module 30 for forwarding received messages through the switching fabric for ultimate delivery to the destination IP address. The data forwarding module may be a dedicated or general purpose processor. In a preferred embodiment, the data forwarding module is a dedicated processor formed in an ASIC for forwarding traffic at the line rate. The data forwarding module can quickly and efficiently add headers to each message for achieving a bridge where appropriate. The data forwarding module is associated with a memory that holds the descriptors. In order to bridge, the central computing engine 18 updates the descriptors in the line cards so that the data forwarding module will form headers that appropriately send messages bound for a protected active line card to its protection line card as well.

Figure 4:
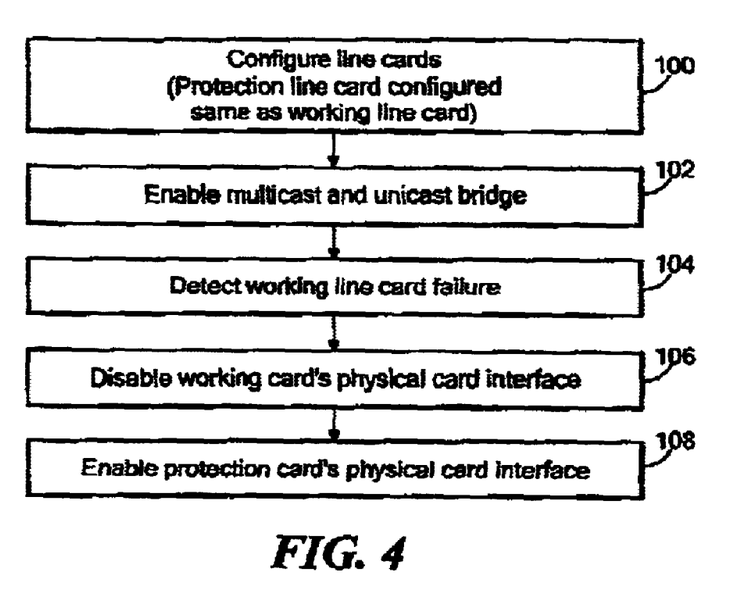
FIG. 4 is flow chart of a method of automatic protection switching in accordance with an embodiment of the present invention.

Referring now to FIG. 4, the series of acts performed in automatically protecting a working line card in a router in accordance with a "1+1" embodiment of the invention are shown. In 1+1, a protection line card is assigned to a working line card and traffic is bridged to both cards even before a failure is detected. This provides the fastest automatic protection from the various schemes described herein. Initially, all the line cards are configured 100. The inbound path tables and outbound path tables of the protection line card and working line card are the same, at least functionally the same. In 1+1, bridging is enabled 102 for multicast and unicast messages before detecting a failure. Descriptors used by the data forwarding modules for selecting headers are updated in all line cards, if necessary, to include the protection association information relating to the protection line card and its associated working line card. Any unicast or multicast message addressed to the protected working line card will be modified by a data forwarding module to also go to the protection line card. Thus, at all times, messages directed to the working line card are bridged to the protection line card as well. The protection line channel does not process the message since the interface with the physical card is disabled. The protection channel will be enabled once a working line card failure is detected 104.

Rapid detection of a failure can be achieved by providing a periodic signal between the working line card and the active line card. The control bus 20 can be used by the active line card to deliver a periodic signal or heartbeat signal to the protection line card. A low speed path on the control bus 20 may be sufficient. If an expected periodic signal is not received by the protection line card within a predetermined time period, the protection line card knows that a failure has occurred. Other methods of detecting a failure include detecting a SONET error rate greater than a threshold level or a stop of traffic on the line suggesting equipment failure. In response to a working line card failure, the physical card interface is disabled 106. The physical card interface when used on a SONET network, for example, will include a packet-over-SONET framer chip. For example, the Lucent TDAT042G5 may be used. Thus, the physical card interface is disabled when the framer is disabled. To complete the protection switch, the physical interface is enabled for the protection line card 108. As such, the protection line card can take over for the working line card within a number of milliseconds. By providing the protection line card with a clone of the inbound and outbound path tables, it can substitute for the failed working line card.

Meanwhile, upon detection of a working line card failure, the protection line card sends an overhead message to the router at the other end of the channel connecting two routers. The overhead message instructs the other router to begin bridging to the protection channel. The overhead message may be in a K1 or K2 byte as is done in the SONET protocol, for example. When the physical card interface is disabled in the working line card of the first router, the protection line card can similarly send an overhead message to the other router instructing it to also disable the working line card and enable the protection line card.

Figure 5:
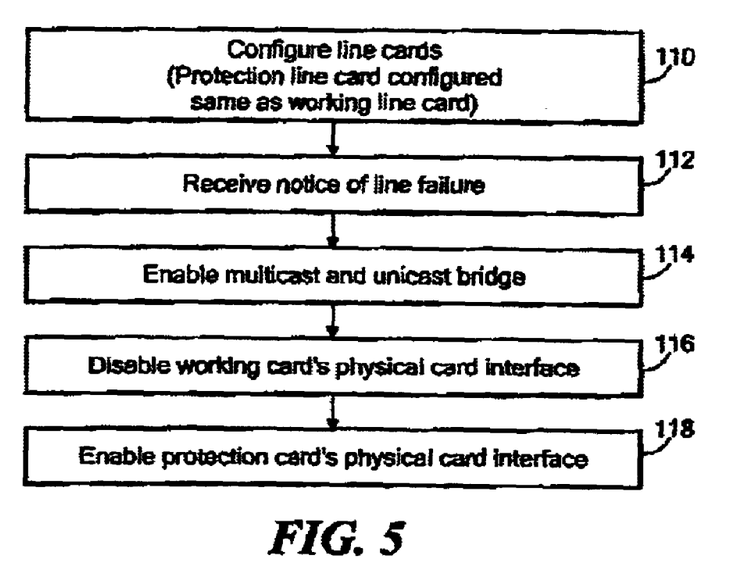
FIG. 5 is a flow chart of automatic protection switching in accordance with an alternate embodiment of the present invention.

Referring now to FIG. 5, a "1:1" embodiment of the invention is shown. Again, the line cards are all configured 110. The protection line card is configured the same as the working line card. The inbound and outbound path tables for the working line card are cloned into the protection line card. The protection line card 112 learns of a working line failure. This may be detected by a heart beat signal that does not arrive. Alternatively, the central computing engine of the router may inform the protection line card of a failure. In this scheme after the failure is detected, bridging is enabled. The central computing engine in the router advises the line cards of the protection association information through communications over the control bus 20. In a preferred embodiment, this involves revising the descriptors. This enables bridging for multicast and unicast messages for all messages directed to the protected active line card 114. Once bridging is in place, the working line physical card interface is disabled 116. The physical card interface for the protection line card is enabled 118 and the automatic protection failover has been completed. Although the 1:1 scheme is slower at switching than the 1+1 scheme, it has the advantage of producing less traffic over the fabric.

Figure 6:
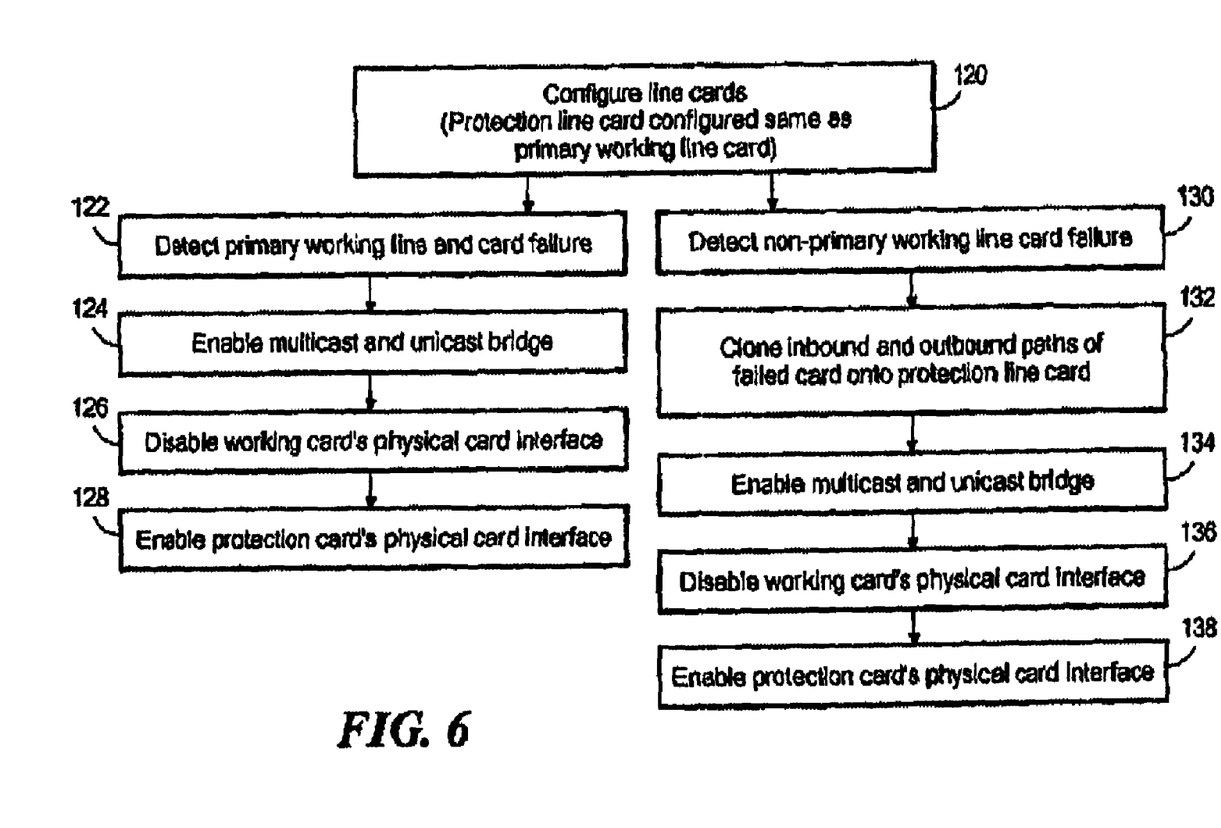
FIG. 6 is a flow chart of automatic protection switching for a system in which one protection line card is used to backup a plurality of active line cards in accordance with the present invention.

FIG. 6 sets forth the acts performed in a "1:N" protection scheme. Here there is one protection line card serving a plurality of active line cards. One of those active line cards is designated the primary working line card. Initially, all of the line cards are configured 120. The protection line card is configured the same as the primary working line card. If there is a failure in the primary working line card, the failover process is the same as in the 1:1 scheme. The primary working line card failure is detected 122. The multicast and unicast bridge is enabled 124 through the central computing engine 18 of the router. The working line card physical interface is disabled 126 and the protection line card physical interface is enabled completing the failover.

If a non-primary working line card failure is detected 130, additional efforts are required. This system works for two routers in connection. Typically, it is the router receiving a message that detects a line card failure. The receiver sends an overhead message to the transmitting router requesting a bridge. In both routers, the inbound and outbound paths of the failed working line card are cloned 132 onto the protection line card. This is done by downloading copies of the tables found in the working line card onto the protection line card. Sufficient information from the inbound and outbound path tables are copied so that the protection line card is made at least functionally equivalent to the working line card. In a preferred embodiment, it is the central computing engine 18 that loads the needed information for cloning the inbound and outbound paths into the protection line card. Tables that are common to all line cards need not be loaded again. It is only necessary at this stage to clone line card-specific tables to bring the protection card into conformity with its associated working line card. Thereafter, the multicast and unicast bridge can be enabled 134 so that messages otherwise directed onto the failed active working line card are now sent by all line cards in the router to the protection line card as well. Enabling the bridging includes updating the descriptors in each line card so as to include protection association information showing the relationship between the failed line card and the protection line card. In a preferred embodiment, central computing engine 18 downloads a descriptor with protection association information to the memories used by each of the data forwarding modules. The data forwarding modules rely on the descriptors to provide an appropriate header for attachment to messages including those that require bridging. Once bridging has been completed throughout the transmitting router, a message is sent to the receiving router confirming that bridging is complete. The physical card interface with the working line card is disabled 136 and the physical interface for the protection line card is enabled 138 in both connected routers.

Program code for achieving automatic protection switching in accordance with the embodiments described herein will be stored in accordance with a preferred embodiment in the central computing engine 18. Cloning of outbound and/or inbound path tables is performed by the central computing engine 18. The timing of the cloning is determined by the automatic protection switching scheme in place. The central computing engine 18 further implements bridging by downloading descriptors with the protection association information.

Figure 7:
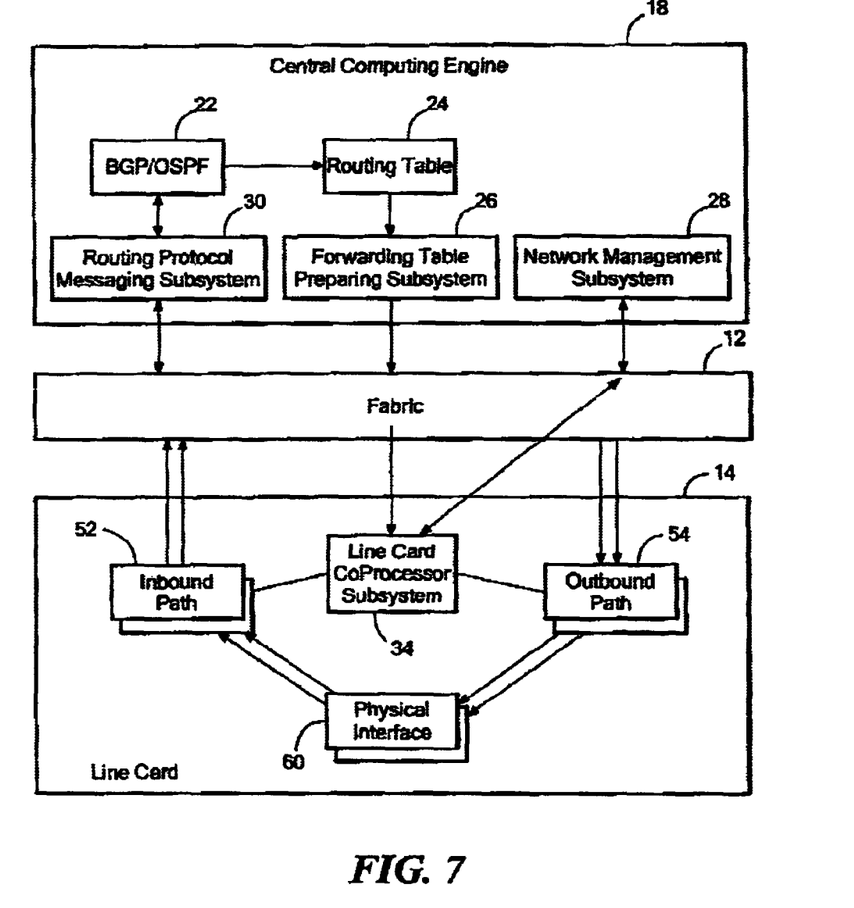
FIG. 7 is a schematic diagram of a line card and central computing engine in an embodiment of a router of the present invention.
Figure 8:
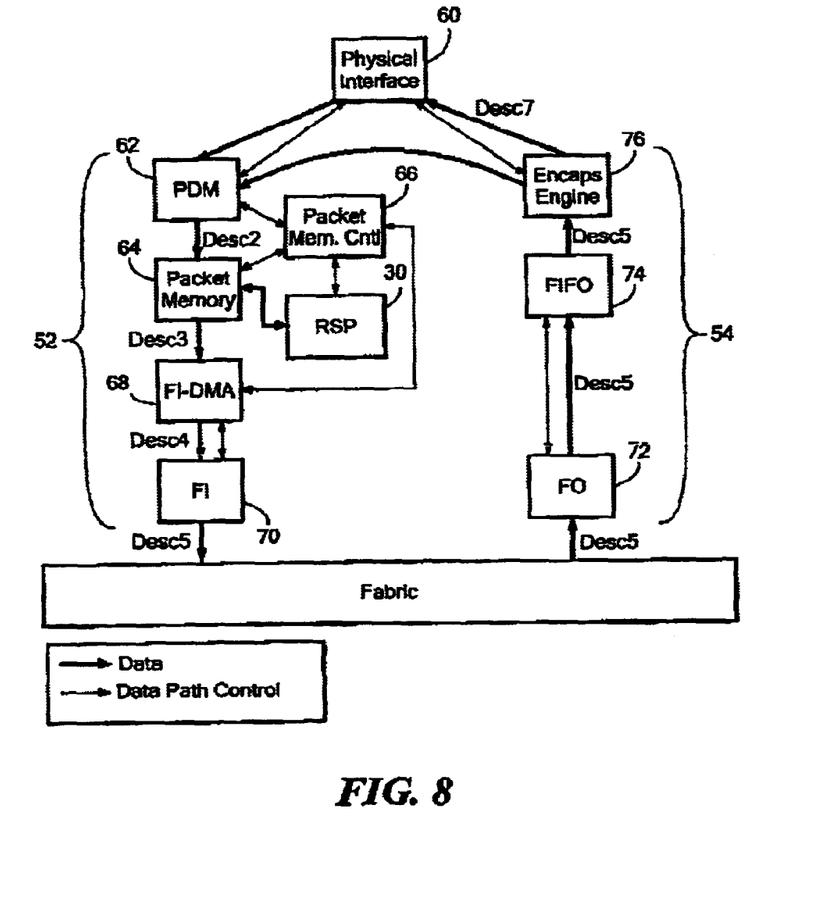
FIG. 8 is a schematic block diagram of the inbound and outbound paths of a line card for use in an embodiment of the present invention.

With reference now to FIGS. 7 and 8, a preferred line card and central computing engine arranged in a router for use with the present invention shall be described. The central computing engine 18 occupies its own slot in the router chassis. A second central computing engine may be installed to provide redundancy in case of a hardware or software failure on the primary engine. The central computing engine preferably runs the full complement of routing and switching application software and thus is responsible for all control functions on the router. Route computation is performed in accordance with a routing protocol 22. For example, the router may be running any of the BGP or OSPF protocols. The routing protocol will produce a routing table 24. Among the functions performed by the central computing engine, forwarding tables are prepared for the line cards in the router. A forwarding table preparing subsystem 26 prepares the forwarding tables including modifying protection association information in the descriptors to accomplish bridging. A network management subsystem 28 supports a console port, Ethernet and a diagnostic port to configure and fetch diagnostic messages. The routing table is kept up to date through the routing protocol messaging subsystem 30 of the central computing engine 18. In a preferred embodiment, the central computing engine includes a processor such as a dual-power PC system with at least 256 MB of local memory. An operating system in the processor can manage the subsystem functions. The central computing engine also has the ability to drive several IO devices which provide an interface to the outside world through dedicated out-of-band management ports (e.g., console, modem and Ethernet) and data storage devices (e.g. PCMCIA/hard disks). The control software, in a preferred embodiment, operates with the central computing engine 18 as the master and the line cards 14 as fully enslaved entities.

The fabric 12 may include high speed and low speed communication paths. The central computing engine uses a reliable messaging transport over the high speed path to efficiently pass large volumes of routing table information between the central computing engine and a co-processor 34 on each line card.

Each of the line cards in a preferred embodiment includes a data forwarding module 30 referred to herein as a route switch processor (RSP). In a preferred embodiment, the RSP is implemented on an ASIC. The RSP preferably includes its own dedicated buffers and fast search memory so it can forward frames between ports in an autonomous fashion. The RSP interfaces with the line card's co-processor subsystem 34 to obtain forwarding table information from the central processing engine.

The co-processor 34 coordinates various tasks on the line card. It interfaces with the fabric 12 to send and receive control, configuration and statistical information. It interfaces with the RSP 30 to set up the routing tables and filters for the inbound 52 and outbound 54 paths. It also provides the encapsulation subsystem information on the method of encapsulation for the outgoing traffic. The encapsulation subsystem is responsible for encapsulating outbound packets with the appropriate forwarding information. A physical card interface 60 is provided on the line cards to send and receive traffic to and from the physical cards.

In a preferred embodiment, the data forwarding module 30 is a totally enslaved co-processor of the central processing engine. All routing information to be applied to incoming packets is supplied by applications running on the central processing engine 18 through the forwarding table preparing subsystem 26. The forwarding table preparing subsystem 26 manages the majority of RSP private and search memories by controlling data structures, lookup tables and routing information in the memories. The RSP 30 is supplied with a 32-bit inbound descriptor for each inbound packet. In normal operation, the RSP reads the inbound descriptors determines the proper destination of the described packet, builds the appropriate outbound descriptor and writes it back to the packet memory in front of the packet. When the destination is a protected association information, the outbound descriptor will include the protection line card so that the message is properly bridged to the protection line card.

The flow of data through a line card of a preferred embodiment shall now be described with reference to FIG. 8. This embodiment is described for use with POS data, but embodiments of the invention may likewise be arranged for use with other data, such as ATM. Level 3 frames, SONET frames in a preferred embodiment, carrying POS (packet over SONET) data arrive at the line card via the POS receive framer in the physical card. A level 3 payload is stripped from the frame leaving a raw point-to-point protocol (PPP) frame. The PPP frame is passed to the line card through physical interface 60. A packet data manager (PDM) 62 is responsible for stripping off the PPP header and building a descriptor that will be used to assist the RSP 30 in packet processing. The PDM prepends the descriptor to the packet as it is transferred to packet memory 64. The PDM 62 will DMA the packets into packet memory using the next available buffer from the free list. When the packet is complete, the PDM 62 will indicate to the RSP 30 that this packet is ready for processing. The packet memory is segmented into even and odd banks to allow sufficient partitioning of bandwidth so that conventional dual ported synchronous SRAMs can be used for storage. The RSP also has the ability to write to packet memory 64. A packet memory controller (PMC) 66 holds off the RSP write if the PDM is currently writing to the same bank. Since the PDM normally alternates between the two banks, the RSP will not be held off for long. The RSP and a fabric input DMA (FI-DMA) 68 use the other port of packet memory 64 for reading. The FI-DMA 68 alternates between banks of packet memory and the PMC 66 will allow RSP reads to a particular bank when the FI-DMA is not using it.

The RSP frequently polls a descriptor queue for packets to be processed. The RSP 30 performs a cache line read of 32 bits from the packet memory 64. This data includes the descriptor prepended to the packet by the PDM 62 and information from the IP header. This information is used by the RSP to do a series of lookups and to process the packet, which ultimately results in a new outgoing packet descriptor. This descriptor for the packet contains the routing information (unicast output port or the multicast port bit vector) to route the packet to its outgoing interface. When a destination port is an active protected port that has bridging enabled, the RSP substitutes the appropriate stored descriptor with protection association information for the descriptor on the packet. This adds the slot of the protection card to the descriptor for the packet. The FI-DMA 68 then accesses the updated packet from a queue in a packet memory 64. The FI-DMA merges the newly formed descriptor with the original packet and packet memory and creates DESC4. The FI-DMA transfers the merged packet along with DESC4 to the fabric ingress (FI chip) 70.

The FI chip 70 creates a DESC5 header in order to pass control and context information to the destination FO chips 72. The destination may be one or more line cards which may or may not include the originating line card. DESC5 is forwarded by the FI over the fabric 12 to the destination slot(s) where it is processed by the receiving fabric output chips (72). The descriptor information is used by the fabric to transport the packet to its respective fabric output port. The fabric output chip 72 receives a packet from the fabric and transfers the received packet through an outbound path to the physical card. The outbound path in a preferred embodiment includes a FIFO buffer 74 followed by an encapsulation engine 76. A protection line card and its associated working line card should have the same physical organization with the same number of FO's. Also, tables (i.e. data whether or not in the form of a table) used in the outbound paths of the working line card need to be cloned in the outbound path of the protection line card. In a preferred embodiment, such tables are used by an encapsulation engine. The descriptor attached to the packet contains the information that the encapsulation engine requires for processing the packet for outgoing transmission. It points to an encapsulation data structure that finds the encapsulation type and outgoing ports for the packet. For all packets, the encapsulation engine 76 must send a packet to the physical interface 60 with the appropriate physical port and encapsulation. For multicast data, the device must also resend the frame the appropriate number of times to the attached physical cards. The packet replication is performed by the FO and controlled by the encapsulation engine 76. The framer places the data from the line card into high level data length controller frames and then places that frame into a level 3 payload. (SONET payload) There is also a path from the encapsulation engine back to the packet memory through the PDM. This path can be used for performance monitoring or for special multicast trapping.

Computer code may implement embodiments of the invention in any conventional computer programming language. For example, preferred embodiments may be implemented in a procedural programming language (e.g., C) or an object oriented programming language (e.g., C++ or JAVA). Alternative embodiments of the invention may be implemented as preprogrammed hardware elements (e.g., application specific integrated circuits and digital signal processors, as discussed), or other related components. In particular, computer code may be implemented in a central computing engine of a router for practicing an embodiment of the invention.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be understood that various changes and modifications to the preferred embodiments described above will be apparent to those skilled in the art. For example, the particulars of the inbound and outbound paths may be changed while still implementing the methods and router construction of the invention. These and other changes can be made without departing from the spirit and scope of the invention and without diminishing its attendant advantages. It is therefore intended that such changes and modifications be covered by the following claims.

We claim:

1. A method for protecting a route from an active line card in a first router having a plurality of line cards to an active line card in a second router having a plurality of line cards comprising:
   providing a protection line card in the first router in connection with a protection line card in the second router;
   detecting a failure of the active line card in the first router;
   revising protection association information stored in the plurality of line cards of the first router such that messages directed through a fabric of the first router to the active line card in the first router are also directed through the fabric to said protection line card; and
   revising protection association information stored in the plurality of line cards of the second router such that messages directed through a fabric of the second router to the active line card in the second router are also directed to said protection line card in the second router.

2. The method of claim 1 wherein the act of revising precedes detecting a failure.

3. The method of claim 1 further comprising disabling the active line card physical card interface and enabling the protection line card physical card interface.

4. A method for protecting a route from an active line card in a first router having a plurality of line cards to an active line card in a second router having a plurality of line cards comprising:
   providing a protection line card in the first router in connection with a protection line card in the second router;
   detecting a failure of the active line card in the first router;
   revising protection association information stored in the plurality of line cards of the first router such that messages directed through a fabric of the first router to the active line card in the first router are also directed through the fabric to said protection line card; and
   wherein said act of detecting comprises failing to detect an expected periodic heartbeat signal from the active line card.

5. A method for protecting a route from an active line card in a first router having a plurality of line cards to an active line card in a second router having a plurality of line cards comprising:
   providing a protection line card in the first router in connection with a protection line card in the second router;
   detecting a failure of the active line card in the first router;
   revising protection association information stored in the plurality of line cards of the first router such that messages directed through a fabric of the first router to the active line card in the first router are also directed through the fabric to said protection line card; and
   wherein the protection association information is found in descriptions stored in the plurality of line cards and further comprising adding a header with data from one of the descriptors to a message so that the message is directed to said protection line card.

6. In a router having a plurality of line cards connected by a fabric, a protection method comprising:
   revising descriptors stored in the plurality of line cards to indicate an association between an active one of the line cards and a protection one of the line cards;
   receiving, in one of the line cards, a message bound for the active line card;
   addressing the message using the revised descriptors such that the message is directed through the fabric to the active line card and also to the protection line card; and
   detecting a failure of the active line card, wherein the act of detecting comprises failing to detect an expected periodic heartbeat signal from the active line card.

7. The protection method of claim 6 further comprising configuring the protection line card with inbound path tables that are clones of inbound path tables in the active line card.

8. The protection method of claim 6 wherein the act of detecting occurs before the act of revising.

9. The protection method of claim 6 further comprising disabling the active line card physical card interface and enabling the protection line card physical card interface.

* * * * *